US012680336B2

(12) United States Patent
Chen et al.

(10) Patent No.: US 12,680,336 B2
(45) Date of Patent: Jul. 14, 2026

(54) ELECTRONIC LOCK CONFIGURED WITH INTERNAL AND EXTERNAL MODULES

(71) Applicant: Meta intelligence LLC, Dover, DE (US)

(72) Inventors: Jian Chen, Zhongshan (CN); Xifeng Wang, Zhongshan (CN)

(73) Assignee: Meta intelligence LLC, Dover, DE (US)

( * ) Notice: Subject to any disclaimer, the term of this patent is extended or adjusted under 35 U.S.C. 154(b) by 0 days.

(21) Appl. No.: 19/243,020

(22) Filed: Jun. 19, 2025

(65) Prior Publication Data

US 2026/0117553 A1 Apr. 30, 2026

(30) Foreign Application Priority Data

Oct. 25, 2024 (CN) ......................... 202422597567.3
Feb. 13, 2025 (CN) ......................... 202520230780.2

(51) Int. Cl.
*E05B 9/08* (2006.01)
*E05B 47/00* (2006.01)

(52) U.S. Cl.
CPC ........ *E05B 9/08* (2013.01); *E05B 2047/0048* (2013.01); *E05B 2047/0058* (2013.01)

(58) Field of Classification Search
CPC ..... E05B 2047/0048; E05B 2047/0057; E05B 2047/0058; E05B 2047/0094; E05B 2047/0095; E05B 9/002; E05B 9/02; E05B 2009/004; E05B 47/00; E05B 47/0001; E05B 47/02; E05B 47/026;
(Continued)

(56) References Cited

U.S. PATENT DOCUMENTS 12,104,407 B1 * 10/2024 Wu ....................... E05B 1/0007
2008/0132100 A1 * 6/2008 Craig ....................... H01R 9/18
70/277
(Continued)

FOREIGN PATENT DOCUMENTS

CN 215056212 U 12/2021
IT 201900000481 A1 * 7/2020 ......... E05B 47/0012
(Continued)

*Primary Examiner* — Christine M Mills
*Assistant Examiner* — Peter H Watson
(74) *Attorney, Agent, or Firm* — Bayramoglu Law Offices LLC

(57) ABSTRACT

An electronic lock configured with internal and external modules includes a first module and a second module installed on inner and outer sides of a door leaf, respectively. The first module includes a first housing and a first circuit board accommodated in the first housing, and the second module includes a second housing and a second circuit board accommodated in the second housing. The first module further includes a first conductive contact arranged on the first circuit board and a first conductive post electrically signal-connected to the first conductive contact, and the second module further includes a second conductive contact arranged on the second circuit board and a second conductive post electrically signal-connected to the second conductive contact; and one of the first conductive post and the second conductive post is formed with an insertion cavity, and the other conductive post can be inserted into the insertion cavity.

7 Claims, 4 Drawing Sheets

(58) Field of Classification Search
CPC ...... E05B 47/0012; E05B 17/00; E05B 15/00; E05B 2047/0071; E05B 9/08; H01R 24/50; H01R 12/52
See application file for complete search history.

(56) References Cited

U.S. PATENT DOCUMENTS

| | | | | |
|---|---|---|---|---|
| 2013/0192317 | A1* | 8/2013 | McKibben | E05B 47/02 292/144 |
| 2017/0116801 | A1* | 4/2017 | Hallett | E05B 9/08 |
| 2020/0074776 | A1* | 3/2020 | Uyeda | H01H 13/70 |

FOREIGN PATENT DOCUMENTS

| | | | | |
|---|---|---|---|---|
| KR | 200384286 | Y1 * | 5/2005 | E05B 9/08 |
| KR | 102716342 | B1 * | 10/2024 | G07C 9/00174 |

* cited by examiner

ELECTRONIC LOCK CONFIGURED WITH INTERNAL AND EXTERNAL MODULES

CROSS-REFERENCE TO THE RELATED APPLICATIONS

This application is based upon and claims priority to Chinese Patent Application No. 202422597567.3, filed on Oct. 25, 2024; and Chinese Patent Application No. 202520230780.2, filed on Feb. 13, 2025, the entire contents of which are incorporated herein by reference.

TECHNICAL FIELD

The present invention relates to the technical field of locks, and in particular to an electronic lock configured with internal and external modules.

BACKGROUND

In modern society, intelligent electronic products are increasingly penetrating every aspect of our lives, with intelligent electronic locks being one of the most favored innovations. These electronic locks leverage electric drive mechanisms to achieve efficient and convenient locking and unlocking functions, significantly enhancing security and user convenience. However, to maintain the normal operation of electronic locks, a stable power supply is indispensable. In traditional electronic lock designs, a power module and an electronic device module are typically installed on the inner and outer sides of a door leaf, respectively, and are in electrical-signal connection via flexible signal wires. While this design partially meets the functional requirements, the actual installation process remains relatively cumbersome. Moreover, since the signal wires are in long-term use, they are prone to performance degradation due to wear, aging, and other factors, ultimately affecting the overall usability of the electronic lock.

To address the aforementioned technical issues, the existing patent CN202022643641.2 proposes a door lock and a door including the same. The door lock includes a first handle, a second handle, and a second handle base cover. The first handle includes a first contact circuit board provided with a first contact point, an insulating stud, and a flexible conductive medium, where the flexible conductive medium is a spring, is housed in the insulating stud, and includes one end maintaining contact with the first contact point. The second handle includes a second contact circuit board provided with a second contact point, and a through-hole conductive fixing screw, where the through-hole conductive fixing screw is fixed to the second handle base cover and incudes one end maintaining contact with the second contact point. When the first handle and the second handle are installed on the door leaf, the flexible conductive medium embedded inside the insulating stud makes electrical contact with the through-hole conductive fixing screw. The technical solutions of this utility model achieve current transmission from the first handle to the second handle without requiring additional wiring interfaces, thereby improving the installation efficiency. However, it should be noted that the spring is constructed from a metal wire with a circular cross-section, resulting in line contact between the tail end of the flexible conductive medium composed of the spring and the front-end wall of the conductive fixing screw. The conductive area is small and increases the risk of unstable or failed electrical signal transmission during the long-term use of the electronic lock.

SUMMARY

How to provide an electronic lock that is easy to install while optimizing the stability of electrical signal transmission is one of the technical problems to be urgently addressed by the present invention. In light of this, the present invention proposes an electronic lock configured with internal and external modules, including a first module and a second module installed on inner and outer sides of a door leaf, respectively. The first module includes a first housing and a first circuit board accommodated in the first housing, and the second module includes a second housing and a second circuit board accommodated in the second housing. The first module further includes a first conductive contact arranged on the first circuit board and a first conductive post electrically signal-connected to the first conductive contact, and the second module further includes a second conductive contact arranged on the second circuit board and a second conductive post electrically signal-connected to the second conductive contact. One of the first conductive post and the second conductive post is formed with an insertion cavity, the other conductive post can be inserted into the insertion cavity, and an outer wall of the other conductive post forms a surface-contact electrical-signal connection with a cavity wall of the insertion cavity.

Based on the aforementioned technical solutions, compared with the prior art, the beneficial technical effects of the present invention are as follows:

One of the first conductive post and the second conductive post is formed with the insertion cavity, the other conductive post can be inserted into the insertion cavity, and the outer wall of the other conductive post forms the surface-contact electrical-signal connection with the cavity wall of the insertion cavity, such that a stable electrical-signal connection structure is formed between the first conductive post and the second conductive post, which is conducive to reducing the risk of unstable or failed electrical signal transmission during the long-term use of the electronic lock and also lowering the requirements for mating accuracy in the length direction (axial direction) between the first conductive post and the second conductive post.

Due to the above features and advantages, the present invention is suitable for application in electronic locks configured with internal and external modules.

DETAILED DESCRIPTION OF THE EMBODIMENTS

The following provides a further explanation of the structure of an electronic lock configured with internal and external modules according to the technical solution of the present invention, with reference to the drawings. Unless explicitly stated as equivalent or alternative embodiments, the various implementation details disclosed below can be selectively applied or combined in a single embodiment, even if they do not have direct functional relevance or synergistic relationships.

Figure 1:
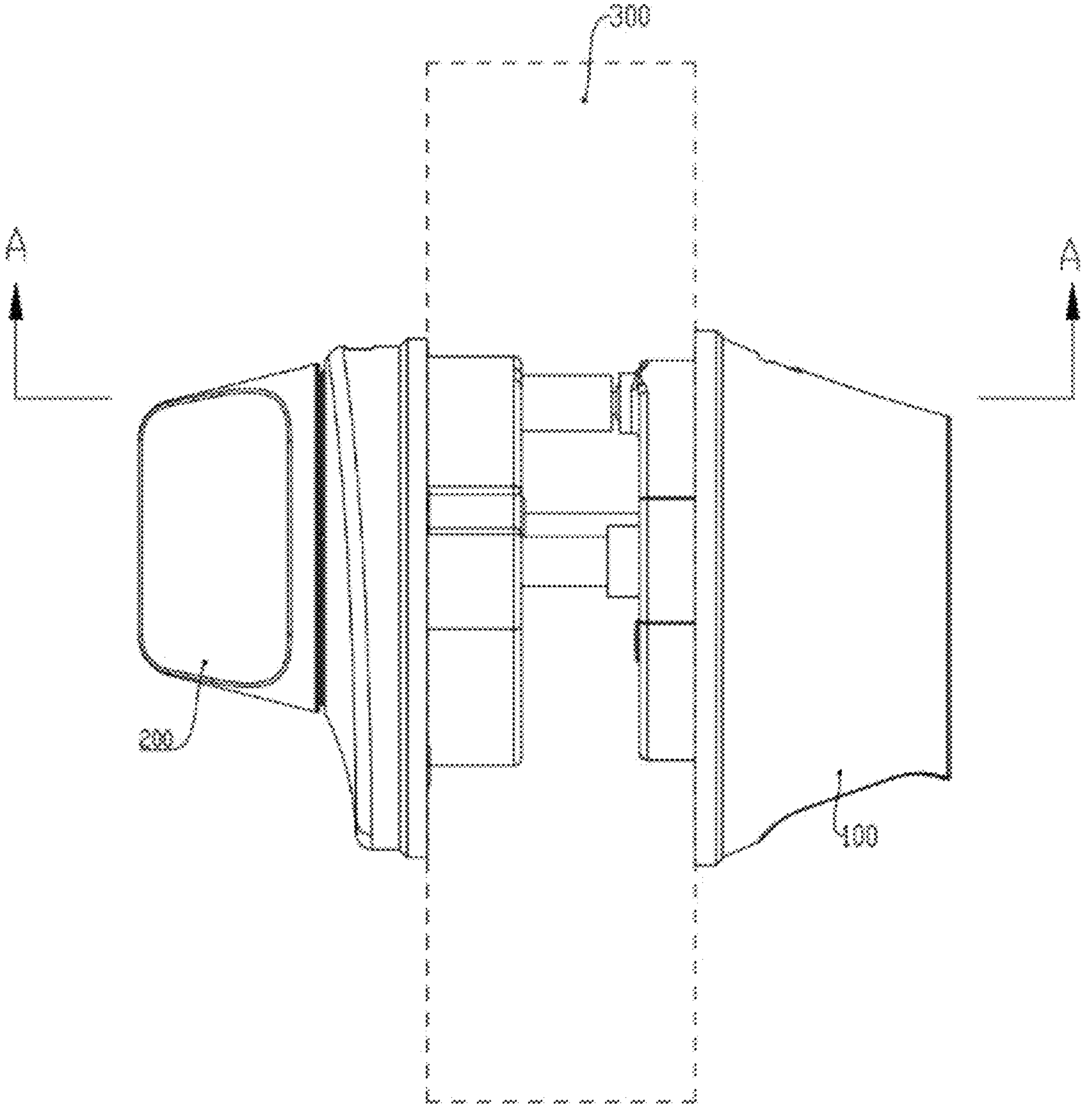
FIG. 1 is a side-view structural schematic diagram of an electronic lock configured with internal and external modules according to the technical solutions of the present invention, where a door leaf 300 is shown as dashed lines.
Figure 2:
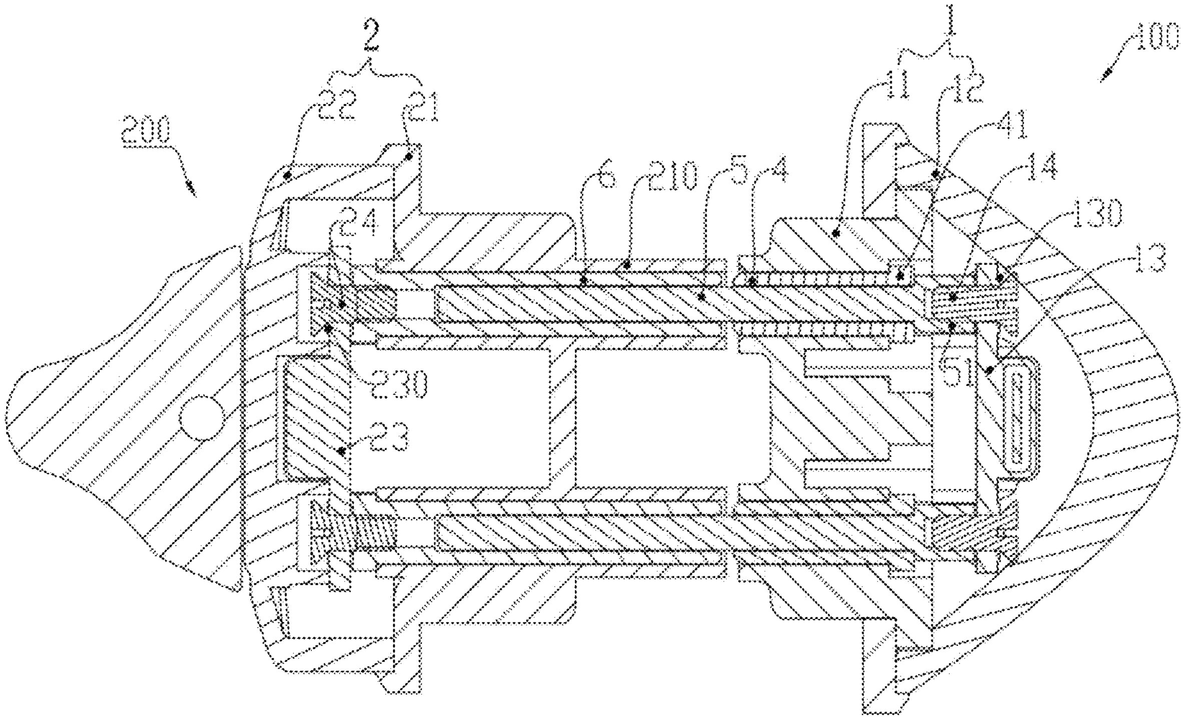
FIG. 2 is a cross-sectional structural schematic diagram along the A-A direction in FIG. 1.

As shown in FIGS. 1 and 2, the present invention proposes an electronic lock configured with internal and external modules, including the first module 100 and the second module 200 installed on the inner and outer sides of the door leaf 300, respectively. The first module 100 includes the first housing 1 and the first circuit board 13 accommodated in the first housing 1, and the second module 200 includes the second housing 2 and the second circuit board 23 accommodated in the second housing 2. The first module 100 further includes the first conductive contact 130 arranged on the first circuit board 13 and the first conductive post 5 electrically signal-connected to the first conductive contact 130, and the second module 200 further includes the second conductive contact 230 arranged on the second circuit board 23 and the second conductive post 6 electrically signal-connected to the second conductive contact 230. One of the first conductive post 5 and the second conductive post 6 is formed with an insertion cavity, the other conductive post can be inserted into the insertion cavity, and an outer wall of the other conductive post forms a surface-contact electrical-signal connection with a cavity wall of the insertion cavity.

Specifically, the first module 100 and the second module 200 are functional modules of the electronic lock. In this embodiment, the first module 100 is installed on the outer side of the door leaf 300, and the second module 200 is installed on the inner side of the door leaf 300. In other embodiments, it is also feasible to install the first module 100 on the inner side of the door leaf 300 and the second module 200 on the outer side of the door leaf 300.

Specifically, the first conductive contact 130 can be in contact and pressed against the first conductive post 5 to form an electrical-signal connection, or the first conductive contact 130 and the first conductive post 5 can be electrically signal-connected through an intermediate conductive component. The same electrical-signal connection structure can also be adopted between the second conductive contact 230 and the second conductive post 6. In this embodiment, both the first conductive contact 130 and the second conductive contact 230 are positive electrode contacts, while the negative electrode contact on the first circuit board 13 and the negative electrode contact on the second circuit board 23 can adopt the plug-in electrical-signal connection structure between the first conductive contact 130 and the second conductive contact 230.

Specifically, one of the first conductive post 5 and the second conductive post 6 is formed with the insertion cavity, which can be understood as that the insertion cavity is arranged at the first conductive post 5 or the second conductive post 6. In this embodiment, the insertion cavity (not marked in FIG. 2 as it is obscured by the first conductive post 5) is formed at the second conductive post 6, the first conductive post 5 is inserted into the insertion cavity of the second conductive post 6, and the outer wall of the first conductive post 5 forms a surface-contact electrical-signal connection with the cavity wall of the insertion cavity. The first conductive post 5 is a rigid metal conductive component. Compared to the flexible conductive medium in the existing patent 202022643641.2, the first conductive post 5 can be more easily and conveniently inserted into the insertion cavity, which is conducive to improving installation efficiency. The insertion cavity of the second conductive post 6 extends axially and opens toward the first conductive post 5, so that after both the first module 100 and the second module 200 are installed on the door leaf 300, the first conductive post 5 can be conveniently inserted into the insertion cavity.

According to the above technical solutions, compared with the prior art, the beneficial technical effects of the present invention are as follows: because the surface-contact electrical-signal connection is formed between the first conductive post 5 and the second conductive post 6, a stable electrical-signal connection structure can be formed between the first conductive post 5 and the second conductive post 6, which is conducive to reducing the risk of unstable or failed electrical signal transmission during the long-term use of the electronic lock and also lowering the requirements for mating accuracy in the length direction (axial direction) between the first conductive post 5 and the second conductive post 6.

Furthermore, the first housing 1 includes the first base 11 and the first cover 12, and the first circuit board 13 is fixedly mounted on the first cover 12 or the first base 11. A first mounting hole (not marked in FIG. 2 as it is obscured by the first insulating sleeve 4) is formed in the first base 11. The first insulating sleeve 4 is further included, which is hollow and has an inner cavity (not marked in FIG. 2 as it is obscured by the first conductive post 5). The first insulating sleeve 4 is formed with the insulating sleeve outer flange 41, and the outer diameter of the insulating sleeve outer flange 41 is larger than the inner diameter of the first mounting hole. The first insulating sleeve 4 is inserted into the first mounting hole, and the insulating sleeve outer flange 41 is restricted to the outer side of the circumferential wall of the first mounting hole. The first conductive post 5 is formed with the post outer flange 51, and the outer diameter of the post outer flange 51 is larger than the inner diameter of the inner cavity of the first insulating sleeve 4. The first conductive post 5 is fixed on the first circuit board 13 and inserted into the first insulating sleeve 4, and the post outer flange 51 is restricted to the outer side of the insulating sleeve outer flange 41. The post outer flange 51 and the circumferential wall of the first mounting hole cooperatively restrict the axial position of the insulating sleeve outer flange 41.

Specifically, as shown in FIG. 2, when the first module 100 and the second module 200 are installed on the inner and outer sides of the door leaf 300, respectively, the first base 11 is closer to the second module 200 than the first cover 12.

Specifically, the first circuit board 13 is fixedly mounted on the first cover 12 or the first base 11, so that the first circuit board 13 is stably positioned with the help of the first cover 12 or the first base 11.

Specifically, the first insulating sleeve 4 and the first base 11 are of a split structure. When the first base 11 is a metal component, the first insulating sleeve 4 can be configured to isolate the first conductive post 5 from the first base 11 to prevent the current flowing through the first conductive post 5 from being conducted to the first base 11 and causing leakage.

Specifically, the insulating sleeve outer flange 41 is restricted to the outer side of the circumferential wall of the first mounting hole, and the post outer flange 51 is restricted to the outer side of the insulating sleeve outer flange 41. Thus, on the basis of the first conductive post 5 being fixed on the first circuit board 13, the insulating sleeve outer flange 41 is clamped between the circumferential wall of the first mounting hole and the post outer flange 51, thereby axially limiting the first insulating sleeve 4. In this embodiment, the first conductive post 5 is inserted into the first insulating sleeve 4 and also into the insertion cavity of the second conductive post 6.

Furthermore, the first conductive screw 14 is also included, which passes through the first circuit board 13 and is threadedly connected to the first conductive post 5. The first conductive screw 14 is in contact and pressed against the first conductive contact 130. Thus, the first conductive screw 14 not only serves as an intermediate conductive component between the first conductive contact 130 and the first conductive post 5 but also fixes the first conductive post 5 on the first circuit board 13.

Furthermore, the second conductive screw 24 is also included, which passes through the second circuit board 23 and is threadedly connected to the second conductive post 6. The second conductive screw 24 is in contact and pressed against the second conductive contact 230. Thus, the second conductive screw 24 not only serves as an intermediate electrical signal transmission component between the second conductive contact 230 and the second conductive post 6 but also fixes the second conductive post 6 on the second circuit board 23.

Furthermore, the second housing 2 includes the second base 21 and the second cover 22. The second base 21 is a plastic component and is integrally formed with the second insulating sleeve 210, and the second conductive post 6 is inserted into the second insulating sleeve 210. Thus, the second insulating sleeve 210 is configured to prevent the current flowing through the second conductive post 6 from being conducted to the outside and causing leakage.

Furthermore, a lock body (not shown in the figure), and a transmission rod (not shown in the figure) and a drive motor (not shown in the figure) respectively installed on the first module 100 are also included. The drive motor (not shown in the figure) is signal-connected to the first circuit board 13 and provides a rotational driving force for the transmission rod. The lock body is provided with a latch for locking the door leaf 300, and the transmission rod is in a transmission connection with the latch. When the transmission rod is driven by the drive motor to rotate forward or backward, the transmission rod can drive the latch of the lock body to retract or extend, thereby achieving the opening or closing of the door leaf 300. Specifically, a controller (not shown in the figure) is arranged on the first circuit board 13. When the controller receives an indication signal for opening or closing the door, it can control the drive motor to drive the transmission rod to rotate forward or backward. The controller can also transmit a control signal to an actuator on the second circuit board 23 through the plug-in connection between the first conductive post 5 and the second conductive post 6.

Figure 3:
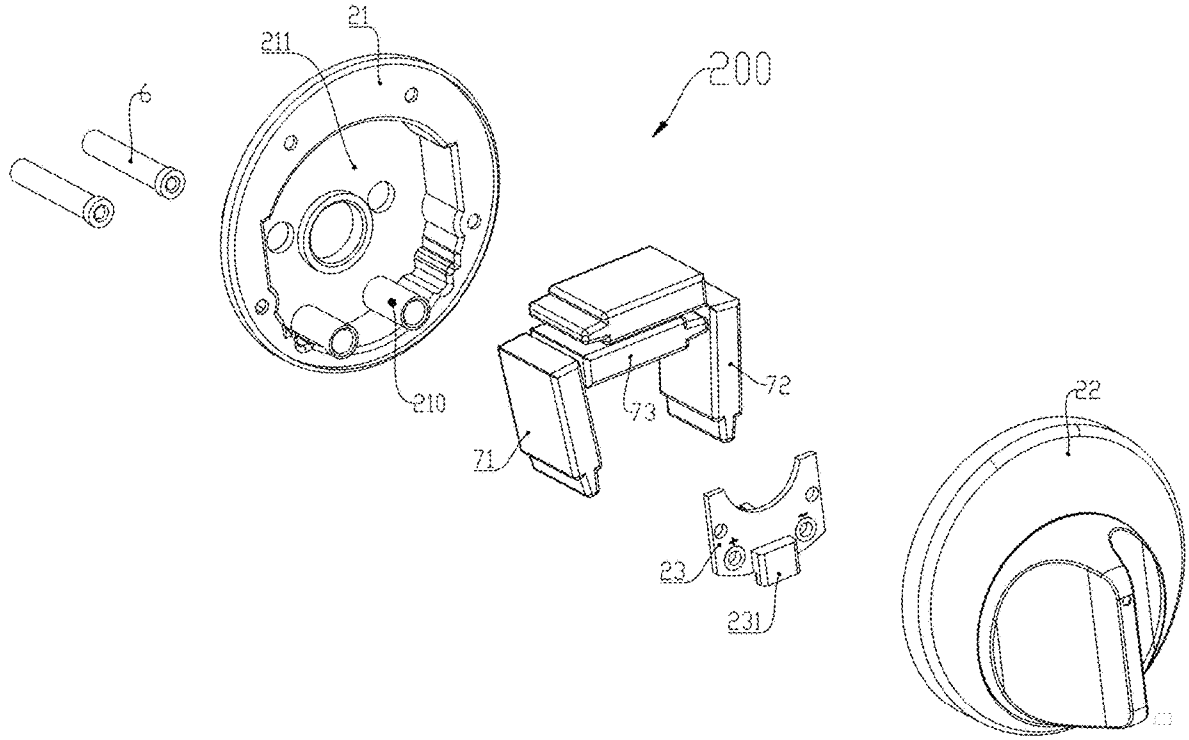
FIG. 3 is an exploded structural schematic diagram of a second module.
Figure 4:
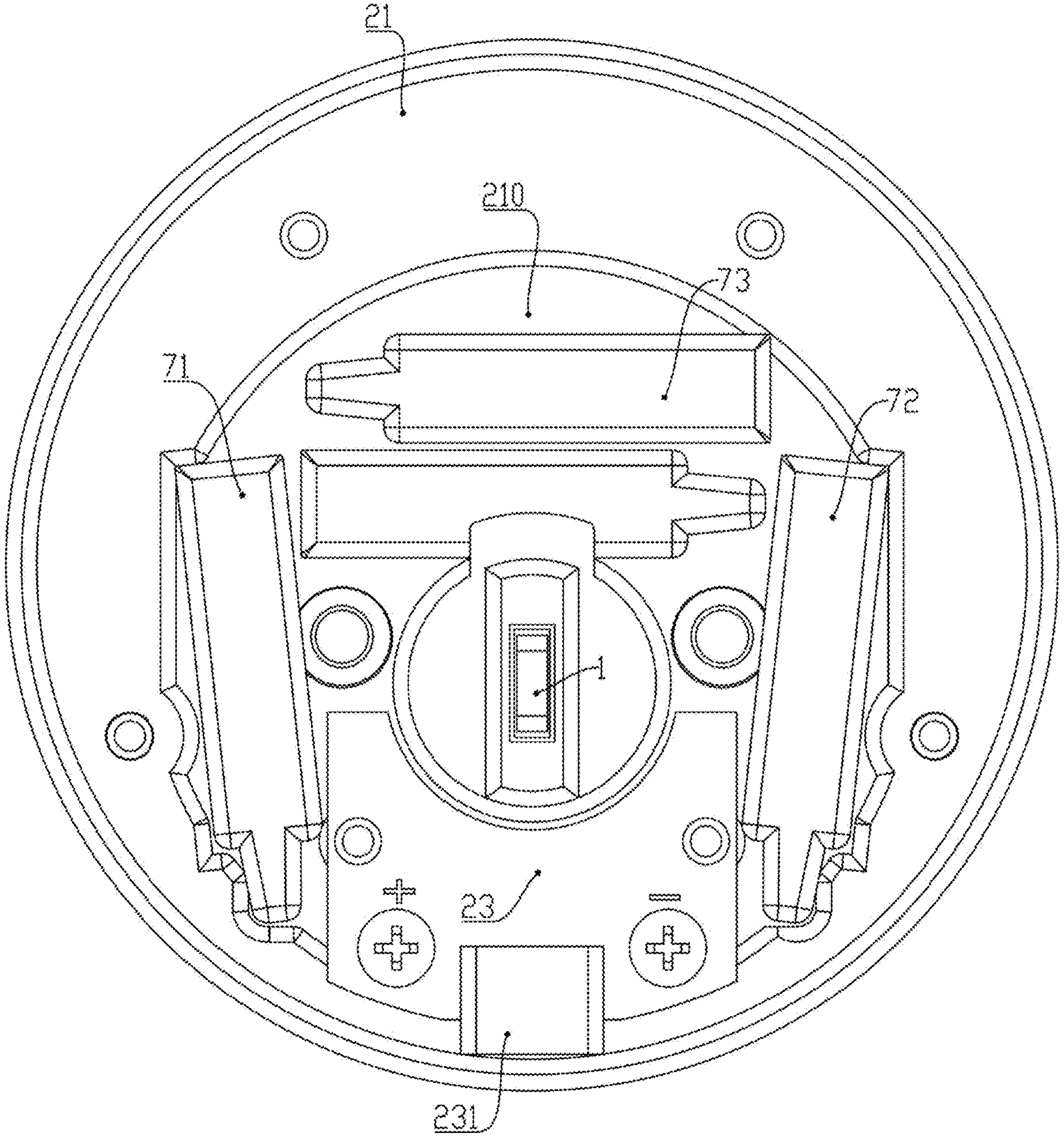
FIG. 4 is a front-view structural schematic diagram of the second module, where a second cover is omitted.

As shown in FIGS. 3 and 4, the battery compartment 211 is arranged inside the second housing 2, and the battery compartment 211 can accommodate batteries. The batteries include the first battery 71, the second battery 72 and the third battery 73, and the first battery 71, the second battery 72 and the third battery 73 are configured to power the second circuit board 23. The first battery 71 and the second battery 72 can be longitudinally arranged on the left and right sides of the second circuit board 23, and the third battery 73 can be transversely arranged on the front side of the second circuit board 23. Thus, the three batteries in such layout mode can efficiently utilize the space inside the battery compartment 211, keeping the battery compartment 211 compact. The interface 231 configured to be connected to an external power source is arranged on the second circuit board 23. Thus, when the batteries are depleted, the second circuit board 23 can still be powered through the interface 231, and the power can be supplied for the electric components on the first module 100 through the plug-in electrical-signal connection structure between the first circuit board 13 and the second circuit board 23.

What is claimed is:

1. An electronic lock, comprising a first module and a second module installed on inner and outer sides of a door leaf, respectively, wherein the first module comprises a first housing and a first circuit board accommodated in the first housing, and the second module comprises a second housing and a second circuit board accommodated in the second housing;

the first module further comprises a first conductive contact arranged on the first circuit board and a first conductive post electrically signal-connected to the first conductive contact, and the second module further comprises a second conductive contact arranged on the second circuit board and a second conductive post electrically signal-connected to the second conductive contact; and a first one of the first conductive post and the second conductive post is formed with an insertion cavity, a second one of the first conductive post and the second conductive post is configured to be inserted into the insertion cavity, and an outer wall of the second one of the first conductive post and the second conductive post forms a surface-contact electrical-signal connection with a cavity wall of the insertion cavity, wherein the first housing comprises a first base and a first cover, wherein the first circuit board is fixedly mounted on the first base or the first cover; a first mounting hole is formed in the first base; the first base further comprising a first insulating sleeve, and the first insulating sleeve is hollow and has an inner cavity; the first insulating sleeve is formed with an insulating sleeve outer flange, and an outer diameter of the insulating sleeve outer flange is larger than an inner diameter of the first mounting hole;

the first insulating sleeve is inserted into the first mounting hole, and the insulating sleeve outer flange is restricted to an outer side of a circumferential wall of the first mounting hole; the first conductive post is formed with a post outer flange, and an outer diameter of the post outer flange is larger than an inner diameter of the inner cavity of the first insulating sleeve;

the first conductive post is fixed on the first circuit board and inserted into the first insulating sleeve, and the post outer flange is restricted to an outer side of the insulating sleeve outer flange; and the post outer flange and the circumferential wall of the first mounting hole cooperatively restrict an axial position of the insulating sleeve outer flange, the electronic lock further comprising a first conductive screw, wherein the first conductive screw passes through the first circuit board and is threadedly connected to the first conductive post; and the first conductive screw is in contact and pressed against the first conductive contact.

2. The electronic lock according to claim 1, further comprising a second conductive screw, wherein the second conductive screw passes through the second circuit board and is threadedly connected to the second conductive post; and the second conductive screw is in contact and pressed against the second conductive contact.

3. The electronic lock according to claim 1, wherein the second housing comprises a second base and a second cover;

and the second base is a plastic component and is integrally formed with a second insulating sleeve, and the second conductive post is inserted into the second insulating sleeve.

4. The electronic lock according to claim 3, wherein a battery compartment configured to accommodate batteries is arranged inside the second housing, and the batteries are configured to power the second circuit board.

5. The electronic lock according to claim 1, wherein a battery compartment configured to accommodate batteries is arranged inside the second housing, and the batteries are configured to power the second circuit board.

6. The electronic lock according to claim 5, wherein the batteries comprise a first battery, a second battery, and a third battery, wherein the first battery and the second battery are longitudinally arranged on left and right sides of the second circuit board, and the third battery is transversely arranged on a front side of the second circuit board.

7. The electronic lock according to claim 5, wherein an interface configured to be connected to an external power source is arranged on the second circuit board.

* * * * *